United States Patent
Nakanishi et al.

(10) Patent No.: US 6,877,908 B2
(45) Date of Patent: Apr. 12, 2005

(54) FIBER WITH FERRULE, AND OPTICAL MODULE AND METHOD OF MANUFACTURING THE SAME

(75) Inventors: Hiromi Nakanishi, Osaka (JP); Yoshiki Kuhara, Osaka (JP); Takeshi Okada, Osaka (JP); Nobuyuki Sakaue, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 66 days.

(21) Appl. No.: 10/193,259

(22) Filed: Jul. 12, 2002

(65) Prior Publication Data

US 2003/0031426 A1 Feb. 13, 2003

(30) Foreign Application Priority Data

Jul. 13, 2001 (JP) .................................... P. 2001-213562

(51) Int. Cl.[7] ................................................ G02B 6/36
(52) U.S. Cl. ............................ 385/78; 385/80; 385/88
(58) Field of Search ............................... 385/78, 80, 88

(56) References Cited

U.S. PATENT DOCUMENTS

| | | | | |
|---|---|---|---|---|
| 6,293,711 B1 | * | 9/2001 | Sasaki | 385/88 |
| 6,296,789 B1 | * | 10/2001 | Go et al. | 264/1.25 |
| 6,332,720 B1 | * | 12/2001 | Shimaoka et al. | 385/88 |
| 6,457,877 B2 | * | 10/2002 | Kato et al. | 385/92 |
| 6,467,972 B2 | * | 10/2002 | Setoguchi | 385/88 |
| 6,517,256 B2 | * | 2/2003 | Okamoto | 385/80 |
| 6,587,618 B2 | * | 7/2003 | Raguin et al. | 385/33 |

FOREIGN PATENT DOCUMENTS

| | | |
|---|---|---|
| JP | 10-154849 | 6/1998 |
| JP | 11-237532 | 8/1999 |
| JP | 11-258467 | 9/1999 |

* cited by examiner

*Primary Examiner*—Akim Enayet Ullah
*Assistant Examiner*—Tina M Lin
(74) *Attorney, Agent, or Firm*—Smith, Gambrell & Russell, LLP

(57) ABSTRACT

The optical module comprises a ferrule, an optical fiber inserted into the ferrule, an optical communication functional unit for making the optical communication with the optical fiber, and a resin molded portion covering a part of the ferrule and the optical communication functional unit. The ferrule is provided with one or more concave grooves in a region exposed from the resin molded portion. Since this concave portion serves as a resin reservoir at the time of molding, the resin is prevented from adhering and covering on the outer surface of ferrule exposing from the resin molded portion.

8 Claims, 8 Drawing Sheets

FIBER WITH FERRULE, AND OPTICAL MODULE AND METHOD OF MANUFACTURING THE SAME

BACKGROUND OF THE INVENTION

1. Field of the Invention

The present invention relates to a fiber with a ferrule used for an optical communication, an optical module using the fiber, and a method for manufacturing the optical module. More particularly, this invention relates to an optical module which can prevent a molding resin from adhering on a top end portion of an outer surface of the ferrule.

2. Description of the Related Art

To reduce the size and cost of an optical transmitter/receiver, it is required to mount a semiconductor laser (LD) and a monitor photodiode (M-PD) on a substrate such as a Si bench by the surface mounting technique. FIGS. 6 and 7 show a manufacturing process of an optical module. FIG. 6 is a flowchart of the manufacturing process of the optical module, and FIG. 7 is an explanatory view of a manufacturing method of the optical module.

First of all, a Si bench 21 having a V-groove for fixing an optical fiber 14 and an electrode pattern for soldering a LD 22 and a M-PD 23 is prepared.

The LD 22 and the M-PD 23 are soldered onto the Si bench 21, and the optical fiber 14 inserted into a ferrule 11 is fixed to the Si bench 21 by the resin. An intermediate product in this state is called a sub-module. At fixing the optical fiber 14, the optical fiber 14 is sandwiched between a glass plate 40 and the Si bench 21.

The sub-module is fixed onto a die pad of a lead frame 20, wire bonded and sealed with a resin by the transfer molding technique, so as to form a resin molded portion 13.

Next, a tie bar 27 and a frame 28 of the lead frame 20 are cut, each lead 29 is electrically isolated. The lead 29 exposed from the resin molded portion 13 is bent at a predetermined angle.

In the above process, a state within a mold at the time of the transfer molding is illustrated in FIGS. 8A–8C. FIG. 8A shows a state where the sub-module fixed on the lead frame is accommodated within the mold before the resin is filled into the mold. In this state, the resin is filled into the mold 30 from a resin filler hole 32 formed at an end face of the mold 30, thereby sealing the sub-module fixed on the lead frame 20 as shown in FIG. 8B.

However, with the above technique, the resin is adhered on a portion of the ferrule 11 exposed from the resin molded portion 13, resulting in a problem of increasing the coupling loss as the connector, or increasing an inferior optical module to lower the yield.

That is, when the sub-module is accommodated within the mold, and transfer-molded, as shown in FIGS. 8A and 8B, the resin exudes (or leaks) from a small gap between the mold 30 and the ferrule 11. In extreme cases, an exuded (or leaked) resin 16 is adhered and covered around a top end side of the ferrule 11, as shown in FIG. 8C.

This cause is considered as below. At the time of transfer molding, the resin temperature is increased up to about 170° C., for example, to soften the resin, and in this state, the resin is injected through the resin filler hole under a high pressure of about several 10 kg/cm$^2$ to about several 100 kg/cm$^2$. The injected resin is filled in a space within the mold, and cured with the elapse of time. Here, the ferrule is made of hard ceramic, and hardly deformed when sandwiched between upper and lower mold parts of the mold. Therefore, a gap as large as several $\mu$m to several 10 $\mu$m is produced between the surface of ferrule and the mold. From this gap, uncured resin is exuded (or leaked) and then cured at the gap between the ferrule and the mold.

The ferrule has a diameter of 1.25 mm, for example. If there is even a slight irregularity of the resin on the outer surface of the ferrule, it impedes the proper fitting with an optical fiber connector of the other side, leading to the dispersed coupling power and the lower yield. Especially, if the resin is exuded remarkably at the time of molding, the optical fiber end face is covered with the resin, as shown in FIG. 8C, thereby increasing an inferior optical module to lower the yield and increase the cost.

SUMMARY OF THE INVENTION

Accordingly, it is an object of the present invention to provide a fiber with a ferrule, an optical module and a method for manufacturing the optical module, in which the resin is prevented from adhering and covering on the top end portion of the outer surface of the ferrule at the time of molding.

It is another object of the present invention to provide a method for manufacturing an optical module in which the ferrule and the resin molded portion can be positioned at high precision.

The present invention can accomplish the above objects by forming a concave portion around an outer circumference of the ferrule.

The fiber with the ferrule, according to the present invention, comprises a ferrule having at least one concave portion and an optical fiber inserted into the ferrule.

The fiber with the ferrule of the present invention can be effectively used for an optical module. The resin exuded from a gap between the mold and the ferrule is stored in the concave portion, whereby the outer circumference of the ferrule and the optical fiber end face are prevented from being covered with the resin. The concave portion is provided at the position of the ferrule that is exposed from the resin molded portion when the optical module is made.

Further, an optical module, according to the present invention, comprises a ferrule, an optical fiber inserted into the ferrule, an optical communication functional unit for making the optical communication with the optical fiber, and a resin molded portion covering a part of the ferrule and the optical communication functional unit, wherein the ferrule has at least one concave portion in a region exposed from the resin molded portion.

By providing the concave portion, the resin exuded from the gap between the mold and the ferrule is stored in the concave portion, thereby preventing the outer circumference of ferrule and the optical fiber end face from being covered with the resin. The concave portion may be formed in width, length and depth sufficient to store the resin exuded from the gap between the mold and the ferrule. The shape of concave portion is not specifically limited, but a groove formed around the entire outer circumference of the ferrule is suitable. Since the groove is formed around the entire circumference of the ferrule, the resin exuded from any position in the gap between the mold and the ferrule can be surely stored within the groove.

The optical communication functional unit comprises at least one of a light emitting element and a light receiving element, and an electronic circuit component. For example, an optical transmission module may employ a LD as the light emitting element and a driver IC for the LD as the electric circuit component. Further, the optical transmission module may use a M-PD for sensing the light intensity of the LD. An optical receiving module may employ a PD as the light receiving element and an amplifier for amplifying the signal of PD as the electric circuit component. The optical transmitting/receiving module may comprise at least one pair of light emitting element and driver IC, and at least one pair of light receiving element and amplifier.

Moreover, a method for manufacturing an optical module, according to the present invention, having a ferrule with at least one concave portion, an optical fiber inserted into the ferrule, an optical communication functional unit, a substrate and a lead frame, the method comprising mounting the optical fiber, the ferrule and the optical communication functional unit on the substrate to form a sub-module, mounting the sub-module on the lead frame, and making a molding for the lead frame where the sub-module is mounted within a mold having an upper mold part and a lower mold part in a state where the concave portion of the ferrule is in contact with mating faces of the upper and lower mold parts which are mated with each other.

By making the molding in a state where the concave portion is in contact with the mating faces of the upper and lower mold parts of the mold, the resin exuded from the gap between the mold and the ferrule can be led into the concave portion. Therefore, the outer circumference of ferrule and the optical fiber end face are prevented from being covered with the resin. The transfer molding is suitably employed.

It is preferable that the mold has a projection formed on at least one of the upper mold part and the lower mold part, and the transfer molding is performed in a state where the projection is fitted into the concave portion. The outside shape of the ferrule and the resin molded portion, especially, the distance between the top end of ferrule and the end surface of the resin molded portion is required to have the high positional precision. If the projection is formed in the mold and the molding is made in a state where the projection is fitted into the concave portion, the optical module can be formed in a state that the distance between the top end of ferrule and the end surface of the resin molded portion is defined at high precision.

DETAILED DESCRIPTION OF THE INVENTION

The preferred embodiments of the present invention will be described below by way of example.

EXAMPLE 1

Figure 1A:
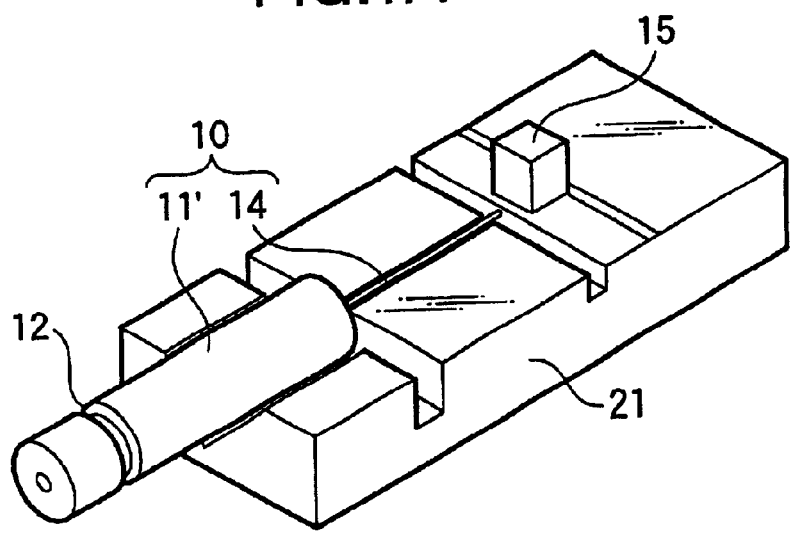
FIG. 1A is a perspective view of a sub-module for an optical module according to the present invention.
Figure 1B:
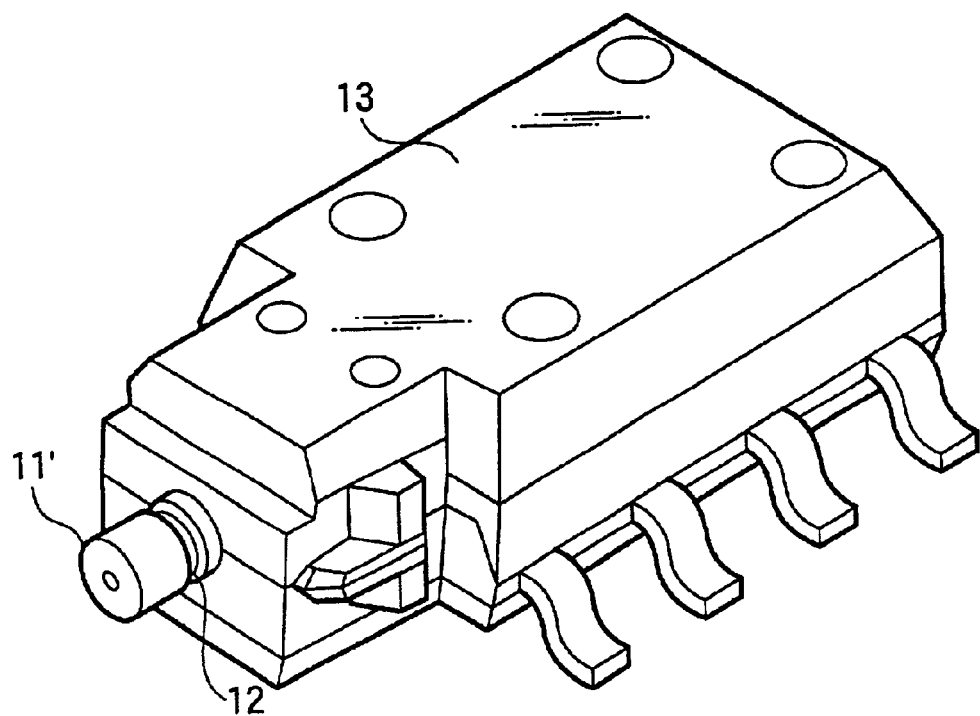
FIG. 1B is a perspective view showing a state after molding the sub-module.

FIG. 1A is a perspective view of a sub-module for an optical module according to the present invention. FIG. 1B is a perspective view showing a state after molding the sub-module and shows an optical module that is ideally molded without any gap between a mold and a ferrule.

As shown in FIG. 1A, a sub-module comprises a fiber with a ferrule 10 where an optical fiber 14 is inserted into a ferrule 11', an optical communication functional unit 15 and an Si bench 21 for mounting the fiber with ferrule 10 and the optical communication functional unit 15 thereon. The ferrule 11' has a concave groove 12 provided around the entire outer circumference of the ferrule 11'. The concave groove 12 is provided on the ferrule 11' so that it is placed outside the outer shape of a resin molded portion 13 formed by molding the sub-module with the resin as shown in FIG. 1B. The optical communication functional unit 15 makes the optical communication with the optical fiber 14, and it is enclosed inside the resin molded portion 13. For example, the optical communication functional unit 15 has an LD and a driver IC.

Figure 7:
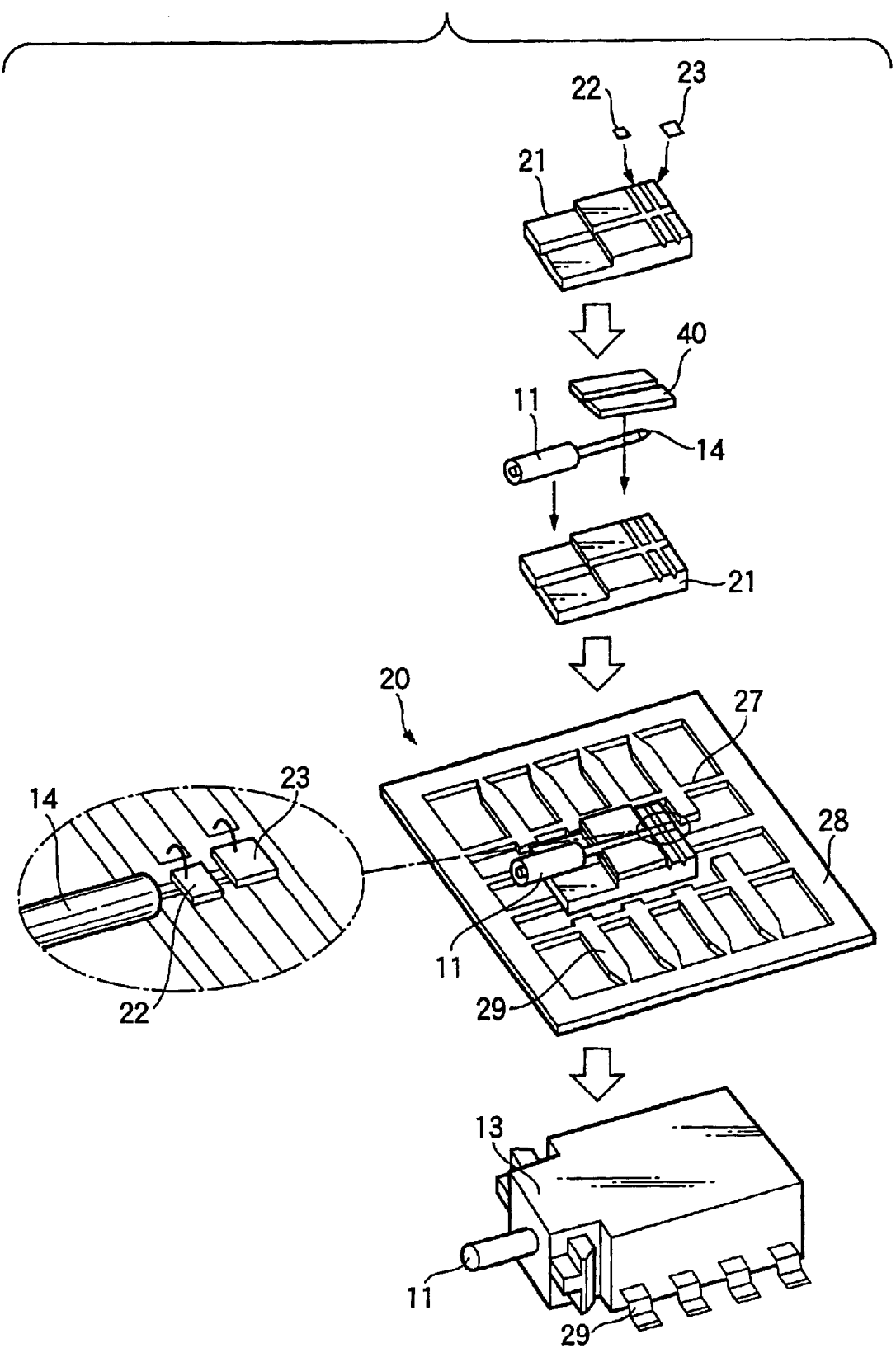
FIG. 7 is an explanatory view of a manufacturing method of the optical module.
Figure 8A:
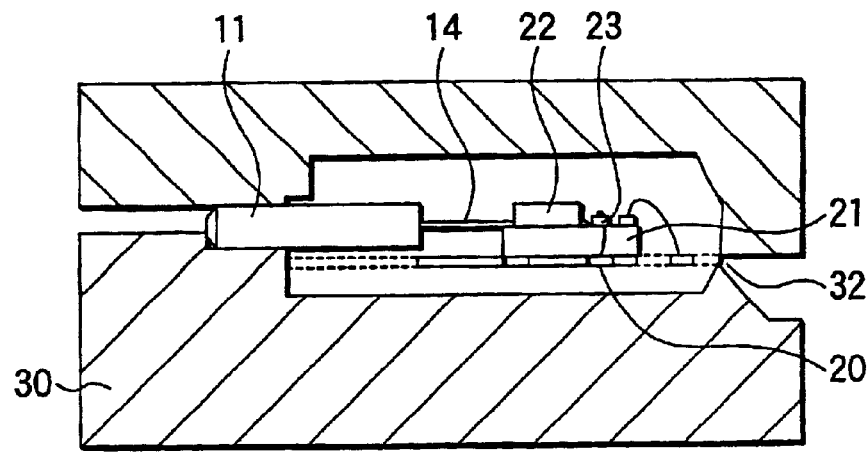
FIG. 8A is an explanatory view of an optical module when accommodated within a mold, in related art.
Figure 8B:
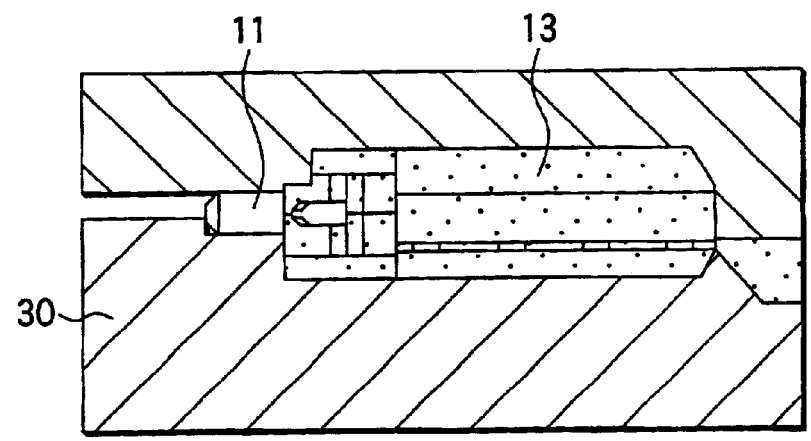
FIG. 8B is an explanatory view of the optical module at the time of filling the resin within the mold, in related art.
Figure 8C:
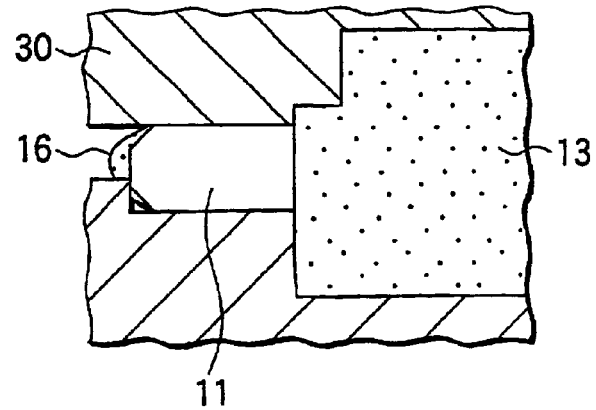
FIG. 8C is a view of an enlarged peripheral portion of a ferrule at the time of filling the resin, in related art.

FIG. 2 shows a specific manufacturing process of the optical module according to the present invention. The sub-module is mounted on a lead frame 20 in the same manner as shown in FIG. 7. That is, an LD 22 and an M-PD 23 are soldered onto a Si bench 21, and a fiber with a ferrule 10 is fixed by the resin onto the Si bench 21 to form the sub-module as an intermediate product. The sub-module is fixed, and connected by a wire bonding 24 to a die pad of the lead frame 20. Then, an obtained component is placed within a mold 30 having an upper mold part 30a and a lower mold part 30b.

Figure 2A:
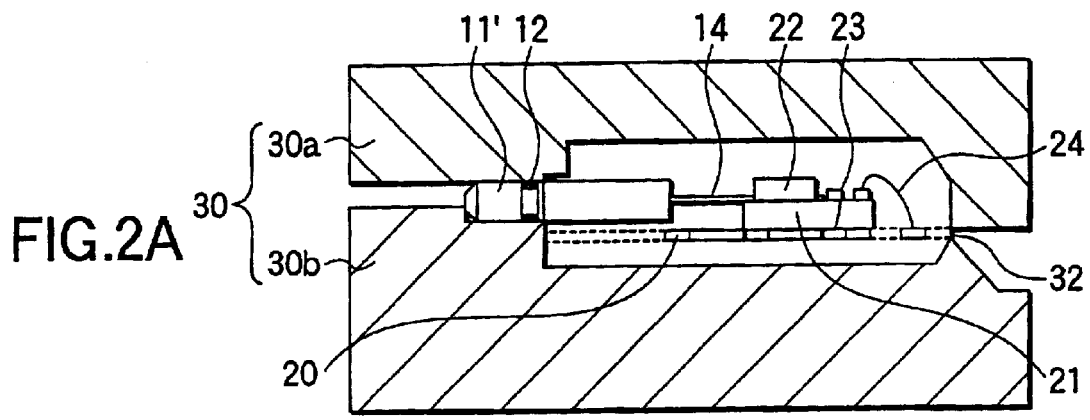
FIG. 2A is an explanatory view of the sub-module when accommodated within a mold.
Figure 2B:
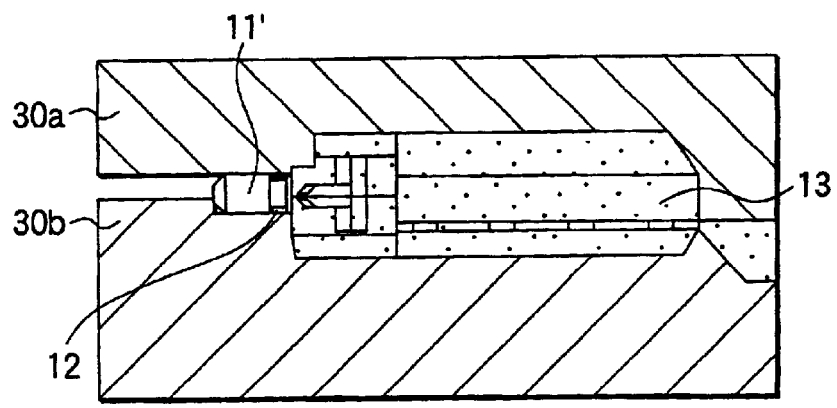
FIG. 2B is an explanatory view of the sub-module at the time of filling the resin within the mold.
Figure 2C:
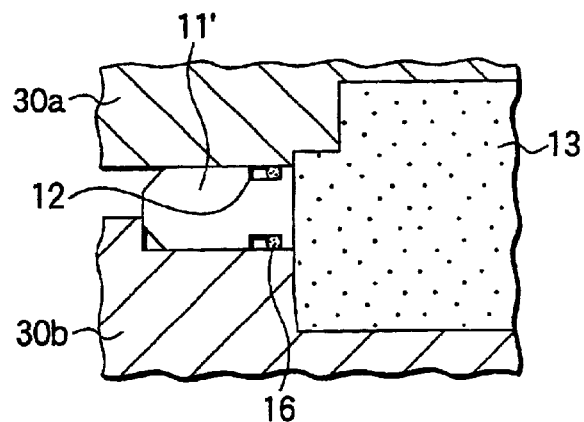
FIG. 2C is an explanatory view of an enlarged peripheral portion of a ferrule at the initial stage of filling the resin.

The ferrule 11' is sandwiched between the upper and lower mold parts 30a and 30b of the mold 30 in a state that the concave groove 12 of the ferrule 11' is in contact with mating faces of the upper and lower mold parts 30a and 30b which are mated with each other, as shown in FIG. 2A. If the resin is injected from a resin filler hole 32 of the mold 30, the resin molded portion 13 is formed except for a portion including the concave groove 12 of the ferrule 11', as shown in FIG. 2B. FIG. 2C shows the enlarged ferrule portion of FIG. 2B with the elapse of the time, in which a resin 16 is exuded (or leaked) from a gap between the mold 30 and the ferrule 11'. The exuded rein 16 is flowed into the concave groove 12. As the concave groove 12 is under the almost atmospheric pressure, the exuded resin 16 is subjected to a lower pressure in the concave groove 12, and filled in the concave groove 12 while being cured with the elapse of the time. Meanwhile, the resin molded portion 13 of the optical module is also cured.

Figure 2D:
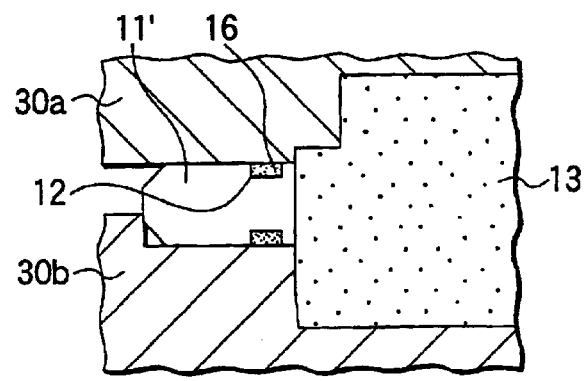
FIG. 2D is a view of the enlarged peripheral portion of the ferrule at the later stage of filling the resin.

When the resin molded portion 13 is completely cured, the exuded resin 16 is cured with in the concave groove 12 without reaching the top end of ferrule 11', that is, does not leak in a direction toward the top end of ferrule 11' from the concave grove 12, as shown in FIG. 2D. Thus, the resin molding process is completed.

Figure 3A:
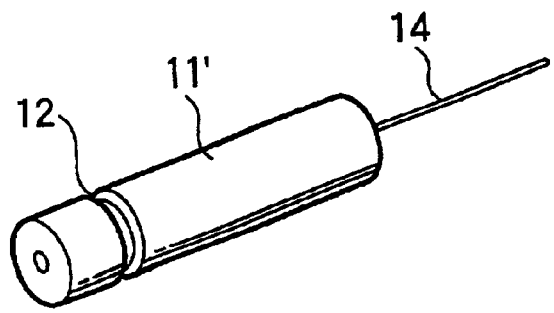
FIG. 3A is a perspective view of a fiber with a ferrule having one groove of a first embodiment of according to the invention.
Figure 3B:
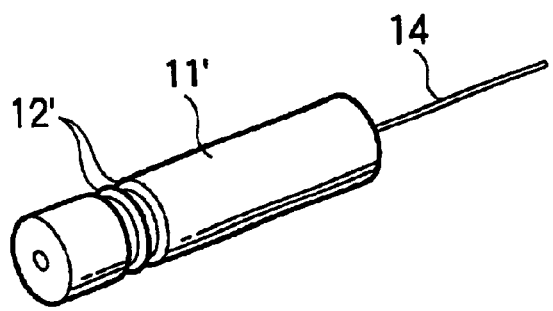
FIG. 3B is a perspective view of a fiber with a ferrule having two grooves of a second embodiment according to the invention.
Figure 3C:
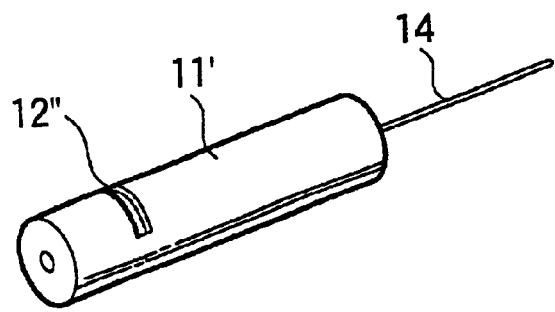
FIG. 3C is a perspective view of a fiber with a ferrule having a semi-circular groove of a third embodiment according to the invention.

FIGS. 3A, 3B and 3C show three embodiments of the fiber with the ferrule 10 according to the present invention.

FIG. 3A is a first embodiment of the fiber with the ferrule in which the concave groove 12 is formed around the entire outer circumference of the ferrule 11'. For example, the ferrule 11' is made of zirconia, and has an outer diameter of about 1 mm to 3 mm, and a length of about 3 mm to 10 mm. The concave groove 12 has a width (in the longitudinal direction of the ferrule 11') of about 1 $\mu$m to 500 $\mu$m and a depth (in the radial direction of the ferrule 11') of about 10 $\mu$m to 200 $\mu$m. The concave groove 12 may be formed by using a mold having a convex portion corresponding to the groove of ferrule when producing the ferrule, or formed by cutting after producing the ferrule. If the width or depth of the concave groove is too narrow or shallow, the exuded resin can not be dammed, that is, the concave groove can not store all of exuded resin. On the contrary, if the width or depth of the concave groove is too wide or deep, the strength of the ferrule or its connection strength with the connector is not sufficient, and the groove working is troublesome.

A fiber portion protruding from the ferrule 11' is as long as about 0 mm to 6 mm. The outer diameter of the optical fiber 14 is typically 125 $\mu$m in the clad portion in a single mode fiber (SMF) or a multi mode fiber (MMF). Of course, these dimensions depend on the sizes of other components, for example, the size of the Si bench, and the arrangement of the semiconductor laser (LD) or the photodiode (PD) that is optically coupled to the optical fiber 14.

FIG. 3B is a second embodiment of the fiber with the ferrule in which two concave grooves 12' are formed around the entire outer circumference of the ferrule 11'. In this case, as the two concave grooves are formed as the resin reservoir for storing the exuded resin, the fiber with the ferrule is useful for the injection of resin for a longer time. Therefore, the resin is more securely prevented from exuding and adhering around the top end of ferrule. Of two concave grooves 12', one concave groove provided in proximity to the resin molded portion may be used as the resin reservoir, and the other concave groove provided apart from the resin molded portion may be used as a fitting hole with the mold at the time of molding, as shown in example 2.

The concave groove 12 may not be formed like a ring as shown in FIGS. 3A and 3B. For instance, the concave groove 12" may have a semi-circular shape, as shown in FIG. 3C. The shape of the concave groove 12 is not limited to the above embodiments, but the exuded resin must not be filled in the concave groove before the resin molded portion is cured.

Figure 4A:
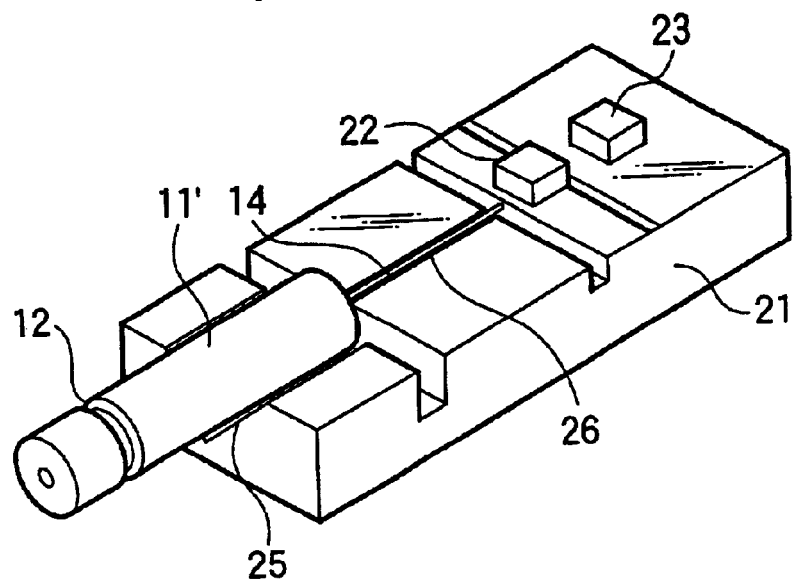
FIG. 4A is a perspective view of a sub-module for use with an optical transmitting module according to the invention.

Practically, the optical module of the present invention was fabricated. First of all, a V-groove 25 for the ferrule 11' and a V-groove 26 for the optical fiber 14 were formed on the Si bench 21 having 10 mm long, 6 mm wide and 1.5 mm thick, by anisotropic etching, as shown in FIG. 4A. Further, a metallization pattern for bonding and a wiring pattern (both not shown) are formed on the Si bench 21 so that the LD 22 and the monitor PD 23 can be disposed on the extension from the top end of the optical fiber 14. Then, the LD 22 and the monitor PD 23 are bonded on the Si bench 21 by a solder material such as AuSn. For example, the LD 22 is a LD composed of a light emitting layer of InGaAsP having a light emitting wavelength of 1.3 $\mu$m, and has a dimension of 300 $\mu$m wide×300 $\mu$m long×120 $\mu$m thick. The monitor PD 23 is, for example, a PD of the end face incidence type composed of a light receiving layer of InGaAs and has a dimension of 400 $\mu$m wide×500 $\mu$m long×200 $\mu$m thick.

Next, the fiber with ferrule 10 is positioned and fixed in the V-groove 25 and the V-groove 26 by the resin. The ferrule 11' has a diameter of 1.25 mm and a length of 6 mm, and the concave groove 12 has a width of 200 $\mu$m and a depth of 100 $\mu$m. The distance from the groove-side end surface of the module resin molded portion 13 formed by the molding to the concave groove 12 is 500 $\mu$m. The protruding length of the optical fiber 14 (SMF) from the ferrule 11' is 3 mm. The V-grooves 25 and 26 and the bonding pattern can be formed at high precision in respect of the relative position by the photolithography technique, whereby the high coupling efficiency is obtained without taking the conventional troublesome procedure of making the alignment by emitting the light from the LD 22.

Figure 4B:
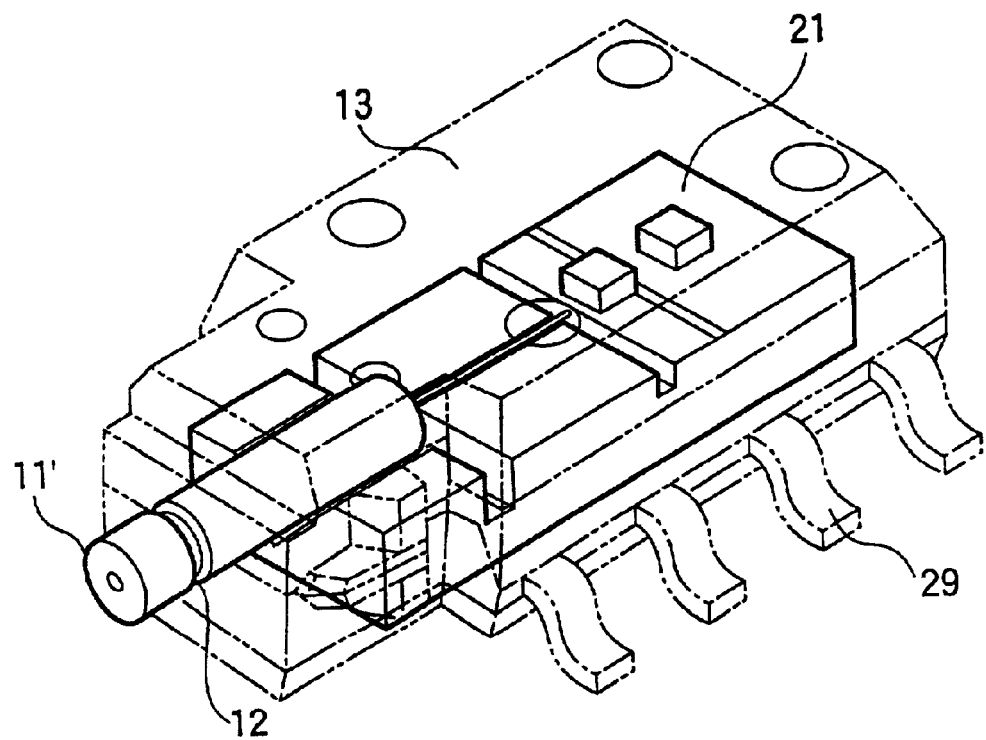
FIG. 4B is a perspective view showing a state where the optical transmitting module is molded with resin.

Then, the transfer molding process is performed to cover the sub-module with the mold resin, except for a part of the lead 29 and the top end portion of the ferrule 11' including the concave groove 12, as shown in a perspective view of FIG. 4B.

The transfer mold resin was the epoxy type, in which the resin temperature was 170° C., the injection pressure was 150 atm, and the pressure of upper and lower mold parts was 17 tons. It took three minutes in total to make the injection of resin, curing, and extraction of the produced optical module.

As shown in FIG. 2, the resin was filled in the concave groove, immediately after extracting the optical module from the mold. The resin stored on the concave groove 12 in the ferrule 11' and the resin adhered between the concave groove 12 and the resin molded portion 13 in the ferrule 11' were removed. Thus an excellent module was obtained, as shown in FIG. 1B and FIG. 4B. Thereafter, the tie bar and the frame of the lead frame are cut, each lead is electrically isolated, and the lead 29 exposed from the package is bent at a predetermined angle. The obtained optical module has no resin adhered on the ferrule 11' exposing from the resin molded portion 13.

EXAMPLE 2

In the above description, the concave portion of the ferrule was employed as the resin reservoir at the time of transfer molding, but may be employed to fit a projection 31 of the mold 30 at the time of molding into it.

Figure 5:
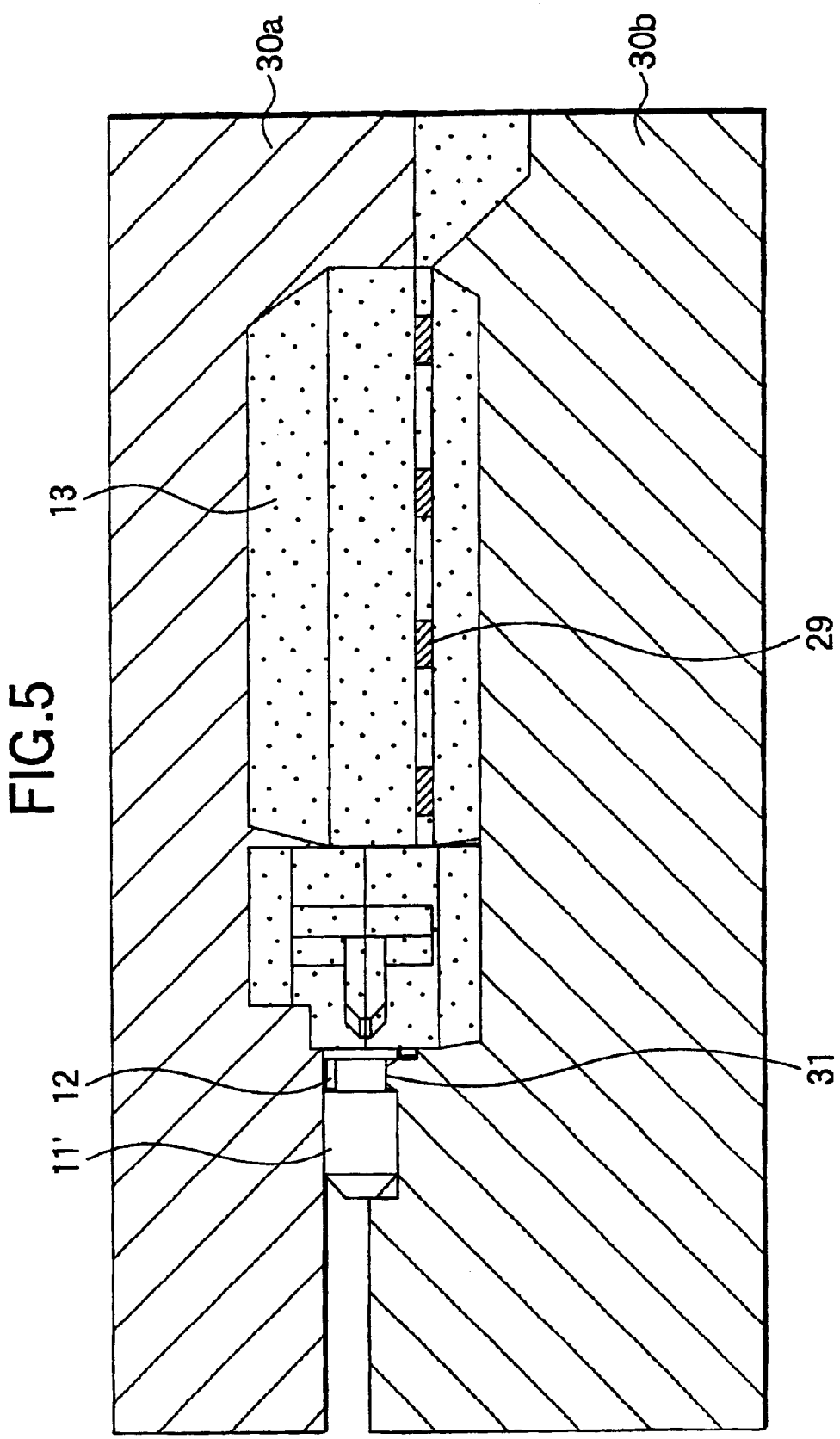
FIG. 5 is an explanatory view showing a state where a projection of a mold is fitted into the concave groove of the ferrule.
Figure 6:
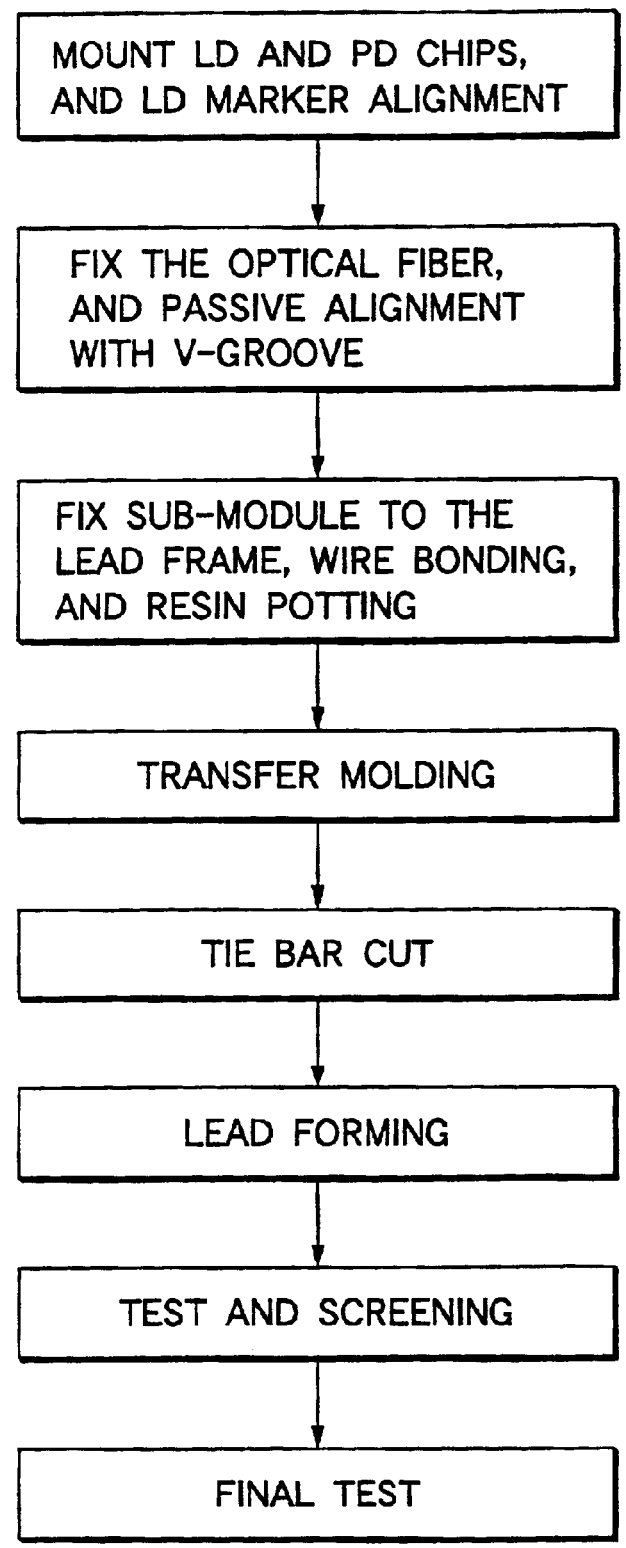
FIG. 6 is a flowchart of a manufacturing process of the optical module.

The mold 30 has a projection 31 formed on an inner face of the mold 30. In this embodiment, the projection 31 is formed on an inner face of the lower mold part 30$b$. The projection 31 is fitted into the concave groove 12 of the ferrule 11' when the optical module is set within the mold 30, as shown in FIG. 5. The top end of the ferrule 11' (or the top end of the optical fiber) is required to be closely contact with the top end portion of the ferrule of the other connector to be fitted with. If the exposing amount of ferrule 11' from the resin molded portion 13 is 2.5 mm, for example, the positional precision from the groove-side end portion of the resin molded portion 13 to the top end portion of ferrule 11' is required to be as large as about ±20 μm to assure the close contact with the other connector. For this purpose, it is required to provide a distance between the groove-side end portion of the resin molded portion and the top end of the ferrule at high precision. In this embodiment, the projection 31 is previously formed in the mold 30. The molding is performed in a state that the projection 31 is fitted into the concave groove 12 of the ferrule 11'. Therefore, the outer shape of the resin molded portion 13 and the top end position of the ferrule 11' can be defined by the shape of the mold. As a result, the positions of the top end of the ferrule 11' and the groove-side end surface of the resin molded portion 13 can be obtained at the high precision. Of course, another concave portion may be formed for positioning the projection 31, but not for reserving the resin, while the concave portion 12 is used as the resin reservoir.

The shape or arrangement of the groove according to the present invention is not limited to the above example, but it is required to be exposed outside the resin molded portion 13.

TEST EXAMPLE

A coupling test was conducted using a connector for the optical fiber having an optical power meter connected at the terminal end. In the coupling test, the connector for the optical fiber was coupled into or decoupled from the ferrule of optical module in a state where the LD module of FIG. 4B is in an illuminant state. For each of 100 samples of the optical module, the coupling test was conducted 100 times. As a result, the variation in the coupling efficiency was small, and all the 100 samples were excellent.

The present invention is not limited to the above constitution. In the above description, the LD module was exemplified, but the optical receiving module may employ the light receiving element such as the PD and the amplifier. Also, the fiber with ferrule of the present invention may be coupled with the module having the optical components such as a waveguide and a filter mounted. Moreover, the bench may be made of ceramic.

As described above, according to the present invention, the concave portion is formed in a region of the ferrule exposed from the resin molded portion, so that the resin is prevented from adhering and covering on the top end side of ferrule by the leakage of resin at the time of molding, whereby the yield is improved, the cost is lowered and the mass production is enabled.

What is claimed is:

1. An optical module comprising:
    a ferrule;
    an optical fiber inserted into said ferrule;
    an optical communication functional unit for making the optical communication with said optical fiber; and
    a resin molded portion covering a part of said ferrule and said optical communication functional unit,
    wherein said ferrule has at least one concave portion in a region exposed from said resin molded portion, and
    said concave portion is a groove formed around an entire outer circumference of said ferrule.

2. The optical module according to claim 1, wherein said optical communication functional unit comprises at least one of a light emitting element and a light receiving element, and an electronic circuit component.

3. An optical module comprising:
    a ferrule;
    an optical fiber inserted into said ferrule;
    an optical communication functional unit for making the optical communication with said optical fiber; and
    a resin molded portion covering a part of said ferrule and said optical communication functional unit,
    wherein said ferrule has at least one concave portion in a region exposed from said resin molded portion,
    wherein the ferrule has a first and second concave portions, the first concave portion being located closer to the resin molded portion than the second concave portion, and
    wherein the first concave portion is used as a resin reservoir for storing a molding resin at the time of molding and the second concave portion is used as a fitting hole for fitting with a mold at the time of molding.

4. A method for manufacturing the optical module having a ferrule with at least one concave portion, an optical fiber inserted into the ferrule, an optical communication functional unit, a substrate and a lead frame, the method comprising:
    mounting the optical fiber, the ferrule and the optical communication functional unit on the substrate to form a sub-module;
    mounting the sub-module on the lead frame; and
    making a molding for the lead frame where the sub-module is mounted within a mold having an upper mold part and a lower mold part in a state where the concave portion of the ferrule is in contact with mating faces of the upper and lower mold parts which are mated with each other,
    wherein said molding step includes fitting a projection provided on at least one of the upper mold part and lower mold part into the concave portion of the ferrule to position the ferrule and the mold at high precision.

5. The method for manufacturing the optical module according to claim 4, wherein said molding step includes molding the ferrule in such a state that at least the concave portion of the ferrule is exposed from the resin molded portion.

6. An optical module comprising:
    a ferrule;
    an optical fiber inserted into said ferrule;
    an optical communication functional unit for making the optical communication with said optical fiber; and
    a resin molded portion covering a part of said ferrule and said optical communication functional unit, wherein
    said ferrule has at least one concave portion in a region exposed from said resin molded portion,
    said optical module is an optical module sealed with a resin by a transfer molding, and
    said concave portion is a groove formed around an entire outer circumference of said ferrule.

7. The optical module according to claim 6, wherein said optical communication functional unit comprises at least one of a light emitting element and a light receiving element, and an electronic circuit component.

8. An optical module comprising:
    a ferrule;
    an optical fiber inserted into said ferrule;
    an optical communication functional unit for making the optical communication with said optical fiber; and a resin molded portion covering a part of said ferrule and said optical communication functional unit, wherein said ferrule has at least one concave portion in a region exposed from said resin molded portion, and said optical module is an optical module sealed with a resin by a transfer molding, and the ferrule has first and second concave portions, the first concave portion being located closer to the resin molded portion than the second concave portion, and wherein the first concave portion is used as a resin reservoir for storing a molding resin at the time of molding and the second concave portion is used as a fitting hole for fitting with a mold at the time of molding.

\* \* \* \* \*